United States Patent [19]

McConnell

[11] Patent Number: 5,738,257
[45] Date of Patent: Apr. 14, 1998

[54] FISHING ROD SUPPORT

[75] Inventor: Lewis Alexander McConnell, Tokoroa, New Zealand

[73] Assignee: Equaliser Tackle Limited, Auckland, New Zealand

[21] Appl. No.: 528,985

[22] Filed: Sep. 15, 1995

[30] Foreign Application Priority Data

Oct. 20, 1994 [NZ] New Zealand ............... 264742

[51] Int. Cl.⁶ ................................. A01K 97/10
[52] U.S. Cl. .............. 224/200; 224/922; 224/666; 43/21.2; D22/147; D3/221; 2/51
[58] Field of Search ............... 224/149, 200, 224/660, 663, 666, 667, 677, 678, 922; 43/21.2; 2/22, 51; 108/43; D22/147, 148; D3/221

[56] References Cited

U.S. PATENT DOCUMENTS

| | | | |
|---|---|---|---|
| D. 319,733 | 9/1991 | Braid | D22/147 |
| 1,597,734 | 8/1926 | Sousa, Jr. | 224/922 |
| 1,985,985 | 1/1935 | Gerline | 224/200 |
| 2,039,922 | 5/1936 | Neats | 108/43 |
| 2,169,080 | 8/1939 | Clark | 224/677 |
| 2,735,596 | 2/1956 | Smedley et al. | 43/21.2 |
| 2,979,990 | 4/1961 | Alexander | 108/43 |
| 3,885,721 | 5/1975 | Vanus | 224/200 |
| 4,817,323 | 4/1989 | Braid | 43/21.2 |
| 4,828,152 | 5/1989 | Pepping | 224/200 |
| 4,858,364 | 8/1989 | Butts | 224/200 |
| 5,069,375 | 12/1991 | Flick | 108/43 |
| 5,081,936 | 1/1992 | Drieling | 108/43 |
| 5,127,181 | 7/1992 | Teixeira | 43/21.2 |

FOREIGN PATENT DOCUMENTS

2113982  8/1983  United Kingdom ............ 43/21.2

Primary Examiner—Henry J. Recla
Assistant Examiner—Gregory M. Vidovich
Attorney, Agent, or Firm—Young & Thompson

[57] ABSTRACT

A one piece moulded wearable gimbal device has an apron 10, an engaging recess 11, and locating hooks 12. The engaging recess 11 extends from the center of the apron 10 downwardly and rearwardly into a portion of the support which is shaped in such a way that it may be positioned between the user's legs when the apron is under load so that the user has greater leverage on the fishing rod than would otherwise be available. Fastened across the recess 11 are one or more transverse pins 14 to support the rod. The locating hooks 12 extend from the top of the apron 10, and are of a size to enable them to be easily secured within a belt 13.

10 Claims, 7 Drawing Sheets

FIG. 13

FISHING ROD SUPPORT

FIELD OF THE INVENTION

This invention relates to the field of fishing equipment, more particularly to equipment for stand-up game fishing, and in particular to wearable fishing rod supports.

BACKGROUND OF THE INVENTION

Traditionally, in big game fishing with rod and line, during playing of a hooked fish, the angler sits in a chair affixed to the fishing boat.

Various sorts of harness have been used to transmit forces from the fishing rod to the angler and/or to the chair. With the largest of game fish the forces involved are so great that this technique is still appropriate. In this way the angler is not subject to unacceptably high forces for the time necessary to play the fish.

However, in recent times techniques known as "stand-up" game fishing have been evolved in which the chair is dispensed with for all but very large game fish. In these techniques, the angler wears a gimbal device in the form of a generally flat rigid plate hanging across the upper thighs from an attached harness.

Usually, in anticipation of a fish being hooked, the gimbal device and harness are worn all the time. This can be uncomfortable to the wearer and can cause unwanted knocks and damage to parts of the boat and other personnel.

The butt end of the rod is formed with a gimbal nock or transverse groove which, when a fish is hooked, the angler engages on a transverse pin rigidly fastened to or near the front face of the plate. This provides a pivot point for the butt end of the rod and prevents the rod being rotated about its longitudinal axis. Thus, some of the rod forces are transmitted direct to the angler's thighs. This makes it possible for the angler to fish in a standing position, which in turn enables him to move round the boat as the fish changes position. The stand-up technique is generally felt to provide more enjoyable and sporting fishing.

In addition to the disadvantages of having to wear the gimbal device continuously, the plate is not well located transversely on the angler's thighs. Thus in the heat of the moment, it has been known for the plate to slip sideways and the gimbal nock can jump free of the transverse pin.

OBJECT OF THE INVENTION

It is an object of this invention to provide an improved wearable fishing rod support for stand-up game fishing, or at least to provide the public with a useful choice.

SUMMARY OF THE INVENTION

According to one aspect of the invention, there is provided a fishing rod support including a substantially rigid apron dimensioned and adapted to traverse and bear upon the front of an angler's thighs, means to attach the apron to the angler and a pivot point on the apron to receive the butt end of a fishing rod, the pivot point being located behind those faces of the apron which are to bear on the front of the angler's thighs, and so that the pivot point will be positioned, in use, between the thighs.

Preferably, the pivot point is located at the bottom of a recess extending rearwardly from the front of the apron.

Advantageously, the recess converges from the front of the apron towards the pivot point.

Conveniently, the recess converges downwardly towards the pivot point.

According to another aspect of the present invention, there is provided a fishing rod support including a substantially rigid apron dimensioned and adapted to traverse and bear upon the front of an angler's thighs, means to attach the apron to the angler, a pivot point on the apron to receive the butt end of the fishing rod, and a rearward projection of the apron adapted, in use, to project between the thighs of an angler.

Conveniently the projection comprises the rear face of a recess extending rearwardly from the front of the apron.

Preferably, the projection is shaped to conform to and fit against and between the front and inner faces of the thighs of the angler.

According to a further aspect of the invention, there is provided a fishing rod support including a substantially rigid apron dimensioned and adapted to traverse and bear upon the front of an angler's thighs, means to attach the apron to the angler and a pivot point on the apron to receive the butt end of a fishing rod, the means to attach the apron including a harness to be worn by the angler and rapid attachment means of the apron to the harness, whereby the angle can wear the harness while fishing and quickly attach the apron thereto when a fish becomes hooked.

Preferably, the apron includes or is formed with a pair of hook means, each of which can be hooked into one of a pair of loops spaced apart on the front of the harness.

Conveniently, the hook means includes a pair of transverse arms extending in opposite directions, one at or adjacent each side of the apron. The arms may point outwardly such as from the upper outer corners of the apron.

BRIEF DESCRIPTION OF THE DRAWINGS

One embodiment of the invention is described by way of example only, with reference to the accompanying drawings, in which.

DETAILED DESCRIPTION OF THE INVENTION

Figure 1:
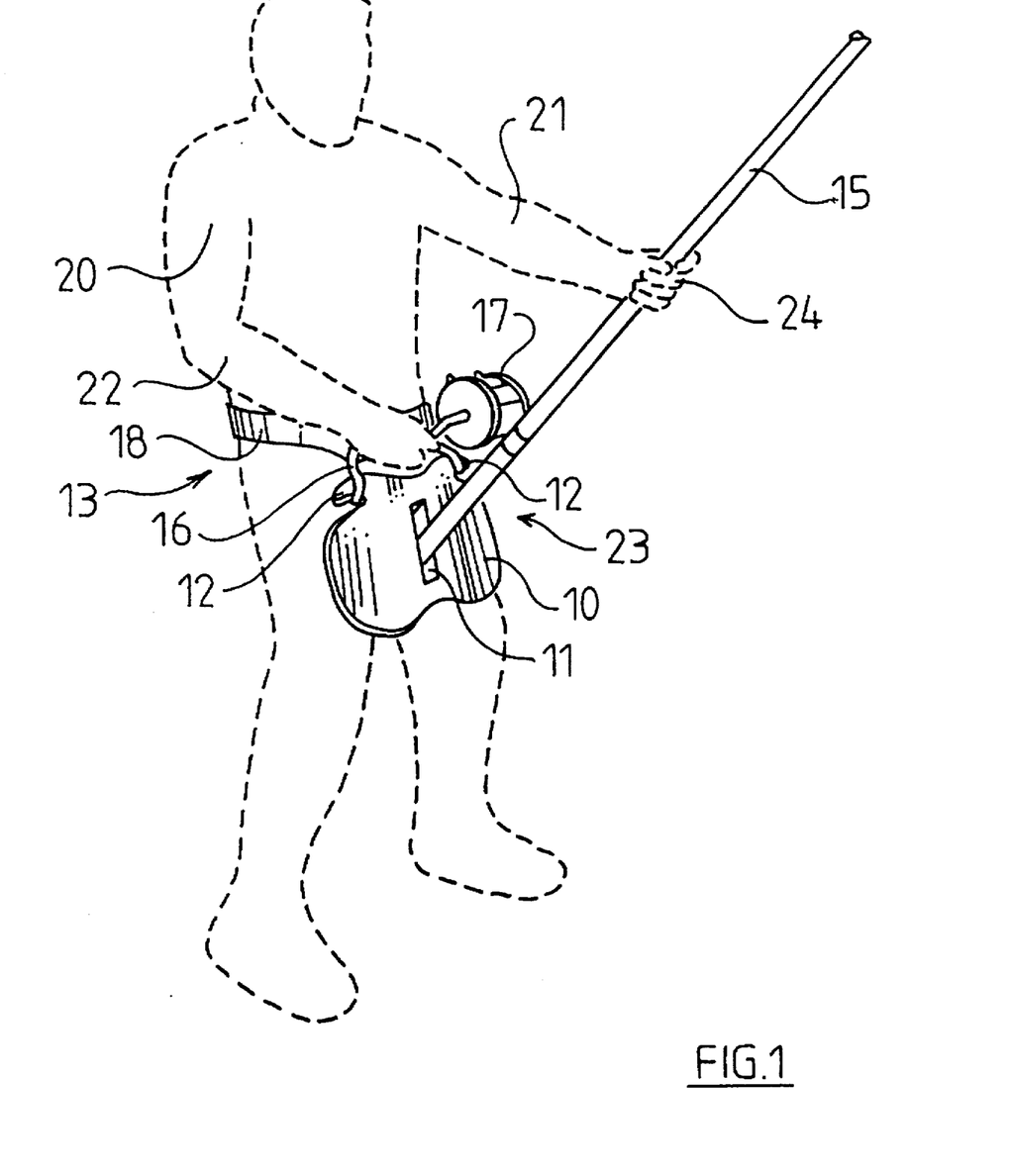
FIG. 1 is a perspective view of an angler using a fishing rod support according to the invention.
Figure 2:
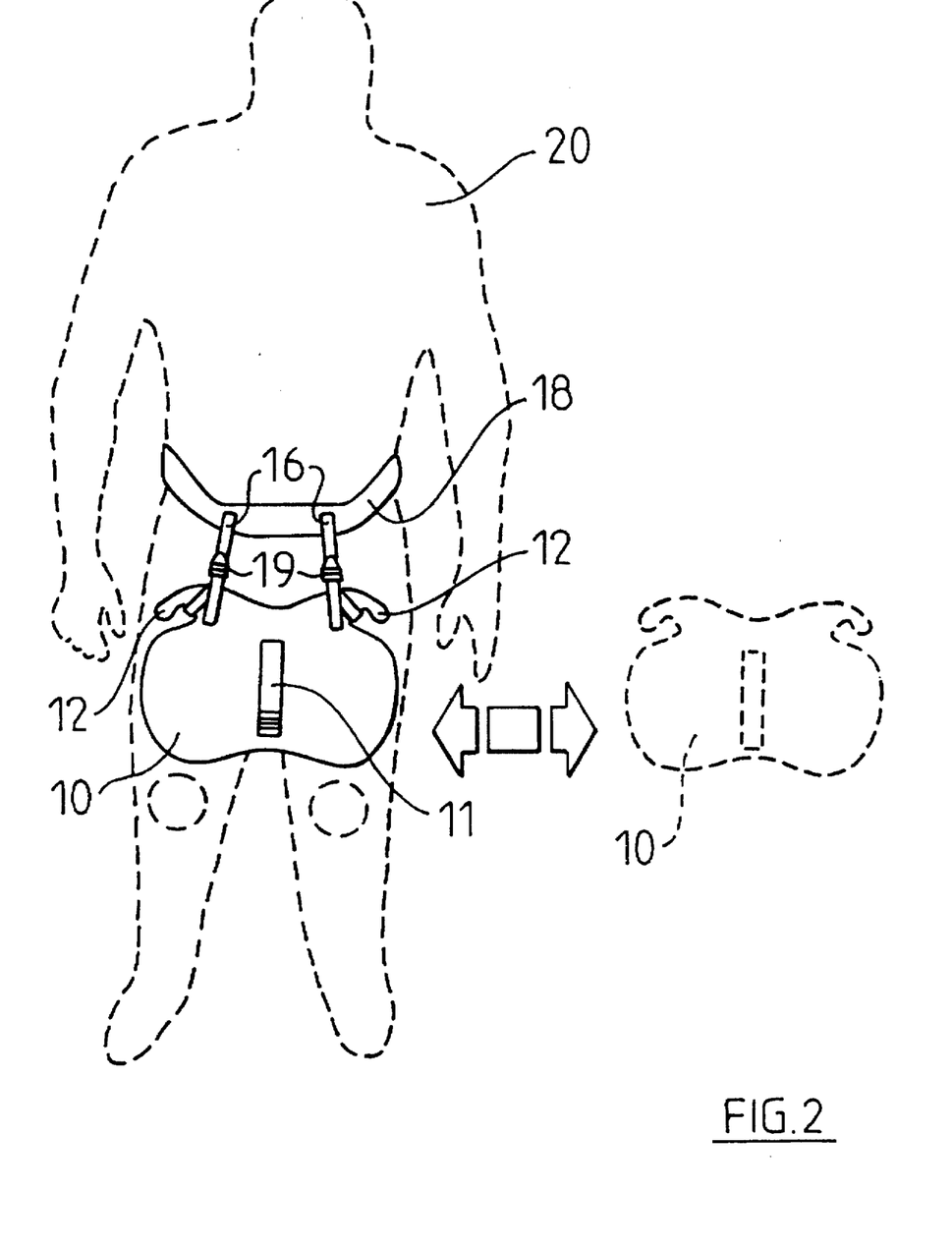
FIG. 2 is a front view of the angler shown in FIG. 1.
Figure 3:
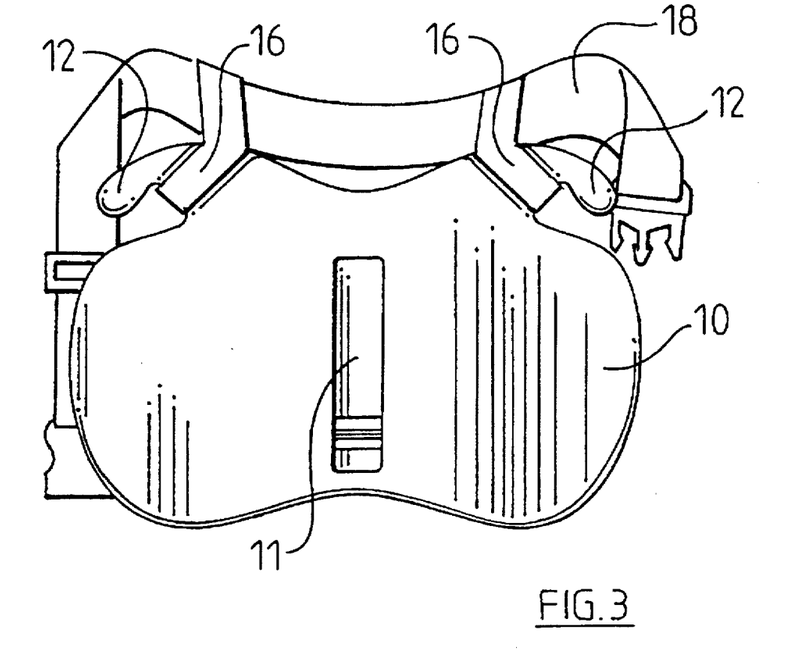
FIG. 3 is a front view of the fishing rod support shown in FIG. 2.
Figure 4:
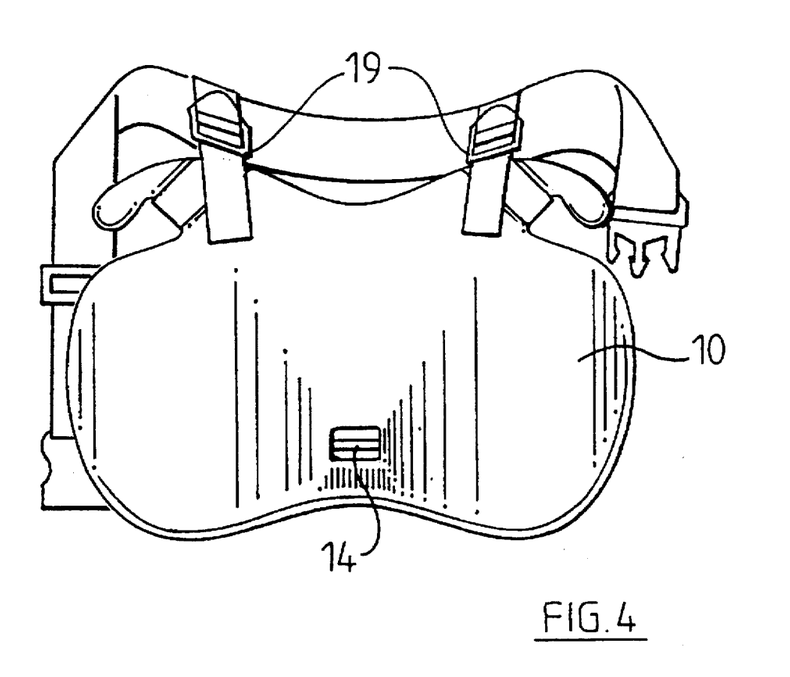
FIG. 4 is a rear view of FIG. 1.
Figures 5, 7:
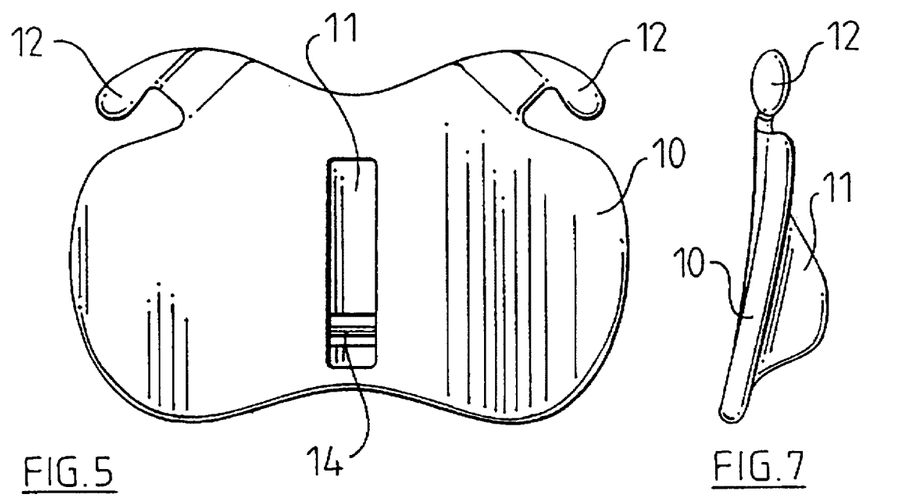
FIG. 5 is a view of part of the fishing rod support shown in FIG. 3.
FIG. 7 is a side view of the part shown in FIG. 5.
Figure 6:
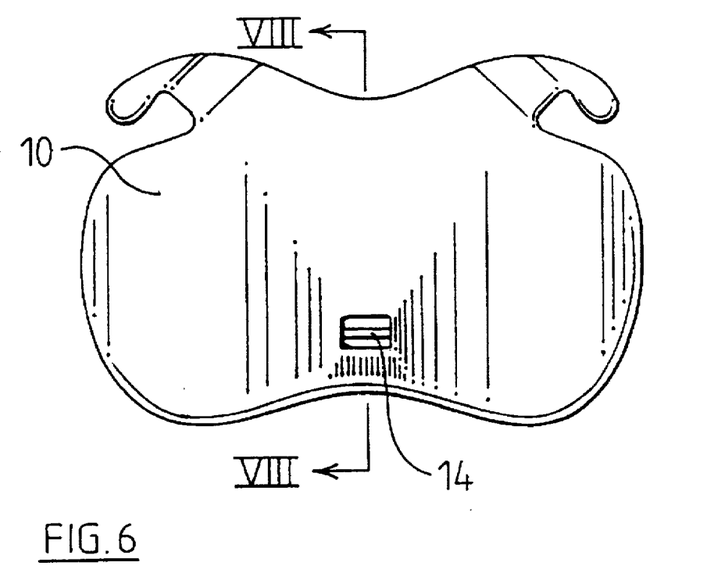
FIG. 6 is a rear view of FIG. 5.
Figure 8:
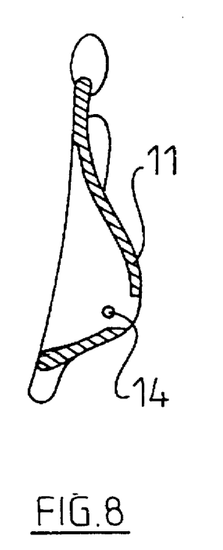
FIG. 8 is a a section along the line VIII—VIII in FIG. 6.
Figure 9:
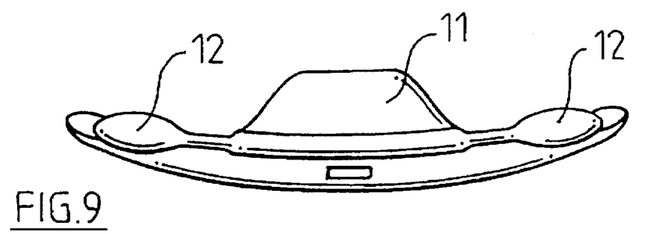
FIG. 9 is a top view of the part shown in FIG. 5.

In FIG. 1 an angler 20 is standing in a typical stance for fishing while using a fishing rod support according to the invention. One arm 21 is extended substantially horizontally to grasp a fishing rod 15 and the other arm 22 is used to operate a fishing reel 17 attached in the usual way to the rod 15. The butt end of the rod 15 is located and supported by a wearable gimbal device 23.

The gimbal device 23 includes an apron 10 formed with an engaging recess 11 and locating hooks 12.

The apron 10 is of one piece, substantially rigid construction. Polycarbonate has been found to be a suitable material, but the invention may be constructed of nylon, fiberglass or any other suitable material.

The locating hooks 12 extend outwardly from the top of the apron 10, and are of a size to enable them to be secured within loops 16 of a harness 13. The harness 13 is preferably of polyester and includes a waist belt 18 to which the loops 16 are attached. The length of the loops 16 are adjustable by buckles 19.

The engaging recess 11 extends rearwards from the center of the apron 10.

Figure 11:
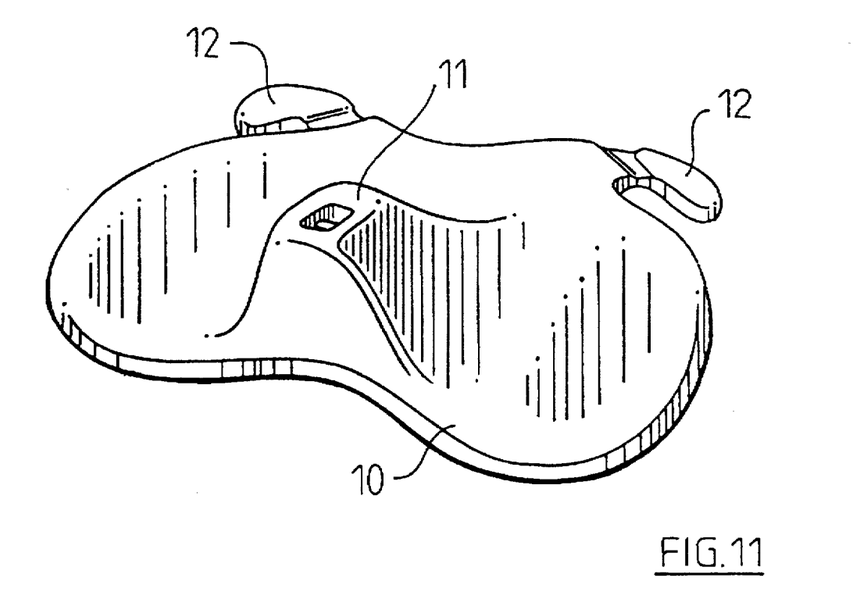
FIG. 11 is a rear perspective view of the part shown in FIG. 6.

The engaging recess 11 converges downwardly from the front bottom of the apron 10. As shown in FIG. 11 the rear of the apron 10 is of a smooth near-parabolic shape on either side of the recess 11.

Fastened across the recess 11 are one or more transverse pins 14.

In use, while waiting for a fish to strike, the angler wears the harness 13 only. On a strike being detected, the angler engages the hooks 12 into the loops 16 on the harness 13 and stands with the apron 10 hanging down and bearing on the front of the angler's thighs. When fighting a fish, the angler normally stands with knees bent. The recess 11 is positioned between the thighs, and the shape of the underside of the apron 10 follows the contours of the inner thigh muscles, thus spreading the load over a greater body area than normal gimbal devices. The near parabolic shape allows it to fit a range of leg sizes. The transverse groove or nock in the butt end of a fishing rod 15 is then engaged on the transverse pin 14. The fit of the apron 11 on the thighs and the rearward position of the recess between them inhibits lateral movement of the rod 15 which is a major problem with most other gimbal devices, when in rough seas or for an inexperienced angler who is trying to lift the rod 15 and then wind the reel 17 to retrieve line.

The low and rearward position of the pin 14 means that the pivot of the rod 15 is positioned lower. Thus, the angler can exert more force on the rod tip, using less effort than if using other known gimbal devices.

In this mode of stand-up fishing, in which the rod support according to the invention is used, for a given length and stiffness distribution of the rod 15, the rod 15 will be used at a lower location relative to the angler 20. Thus the tension force in the line from the rod tip to the fish will produce a smaller forward-tilting moment on the angler 20 about the pivot of his feet on the fishing boat deck. This reduced moment can be balanced by the weight of the angler 20 with less backward lean of the angler, and thus with less stress and discomfort and greater stability.

Figure 12:
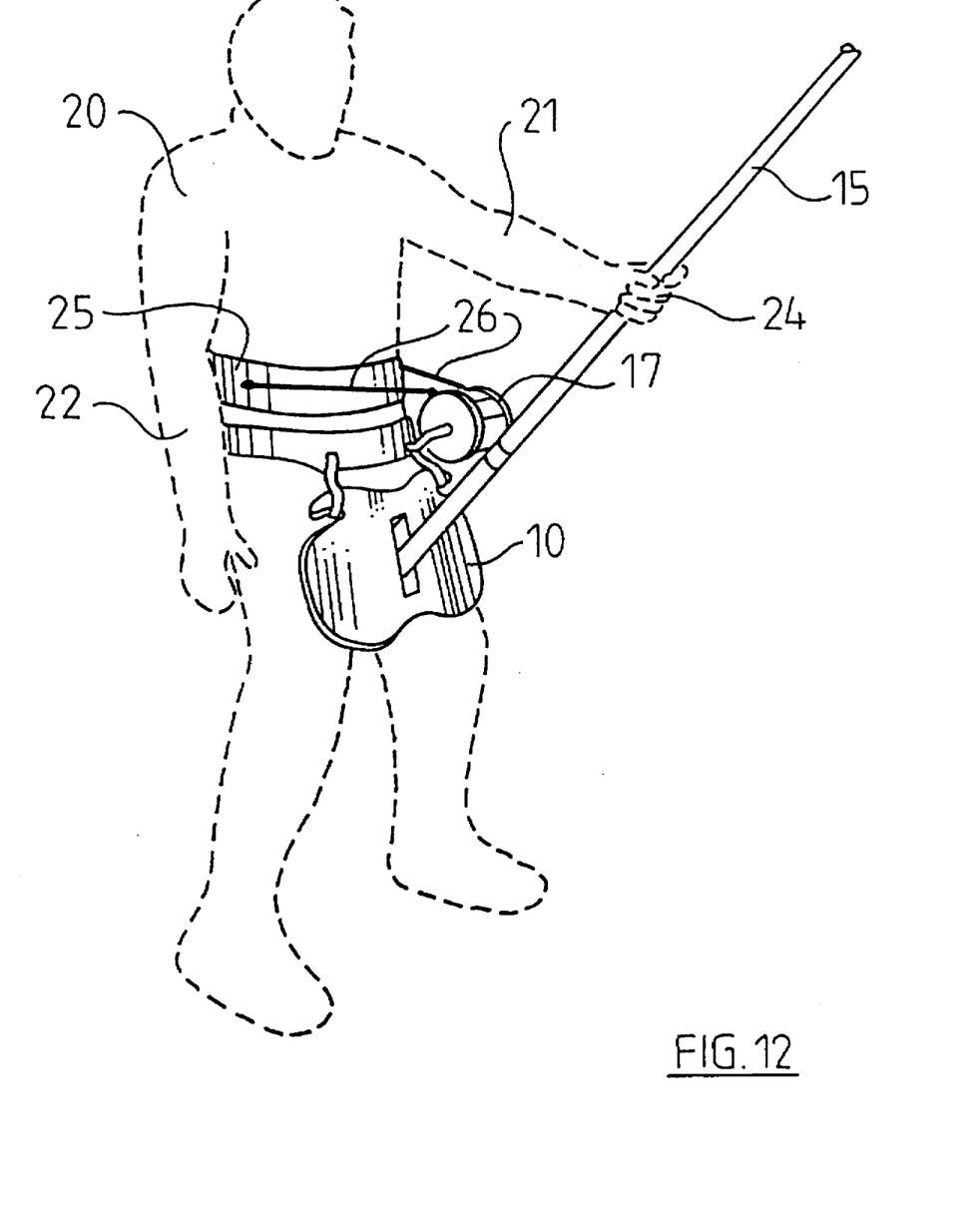
FIG. 12 is an alternative to FIG. 1.

Preferably for optimum benefit in using the fishing rod 15 support, a rod is used in which the distance from the hand 24 of the arm 21 to the butt end if the rod 15 is around 120 to 200 mm longer than normal. The length of rod 15 from the hand 24 to the rod tip can be substantially less than the prior art arrangement and the reel 17 can be located at a normal distance below the hand 24, ie in this case the reel position has moved further away from the butt of the rod. If the angler removes his hand and relies on a kidney harness as shown in FIG. 12 the pulling point is then further up the rod (away from the butt) than is the case of a kidney harness attached to a reel on a prior art gimbal device.

Since the lever arm of the rod 15 from the hand 24 to the butt end is greater than normal, and the lever arm from the hand 24 to the rod tip is closer to the tip than is the case with prior art arrangements, a given tension in the line from the reel 17 will produce a substantially smaller tensile force in the arm 21.

This can make the playing of a fish more comfortable and less tiring. Alternatively, for a given acceptable tensile force in the arm 21, a larger fish can be handled by the stand-up fishing technique.

We prefer to position the pivot pin in the horizontal plane, however other manufacturers may prefer to position the point at other angles for example in the vertical plane. Our interpretation of the IGFA (International Game Fishing Association) rules and regulations would make a vertical pin illegal. However, in some circumstances the pin 14 may be preferred to lie in a vertical fore-and-aft plane, if the regulations become changed in the future.

In FIG. 12 an upper kidney belt 25 is shown around the angler 20 and attached by hooks 26 to the reel lugs.

Figure 13:
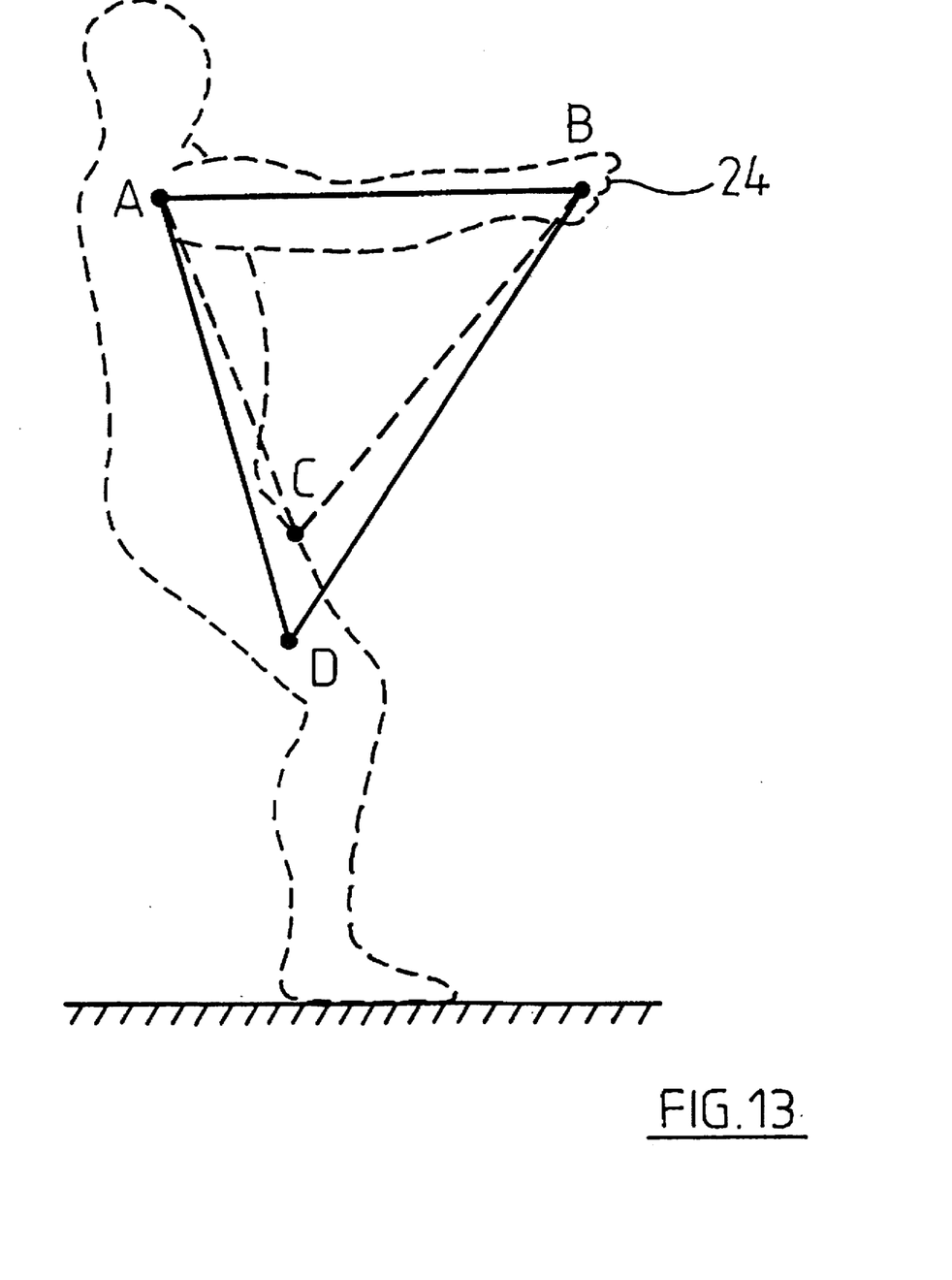
FIG. 13 shows the "fishing triangle" achieved with a prior art gimbal device compared with a gimbal device of this invention.

FIG. 13 Shows the relative positions of the "fishing triangles" ABC, ABD achieved with a prior art gimbal device and the gimbal belt of FIG. 12. In the triangles, A B represents the line of force from the angler's shoulder to the hand 24, BC is the length of rod 15 between the hand 24 and the prior art pivot point C, and BD is the length of the rod 15 from the hand 24 to the pivot point D of the present invention. The "fishing triangle" of the gimbal device of FIG. 12 aligns the line AD between the lower pivot point and the angler's shoulder joint more in line with the angler's spine than is the case with a prior art gimbal device which has the pivot point C higher and more forward than the gimbal of FIG. 12. In FIG. 12 the angler can move his hand further up the rod towards the tip than is the case with the prior art arrangement, hence allowing the angler in FIG. 12 to increase his leverage compared with the prior art triangle shown in FIG. 13. For a heavy fish the angler may lean back much further than shown in FIG. 13.

Instead of the pivot point D being a transverse or other pin 14, the butt end of the rod 15 can simply bear against a wall at the bottom of the recess 11 or in a depression therein.

EXPERIMENTAL RESULTS

Figure 10:
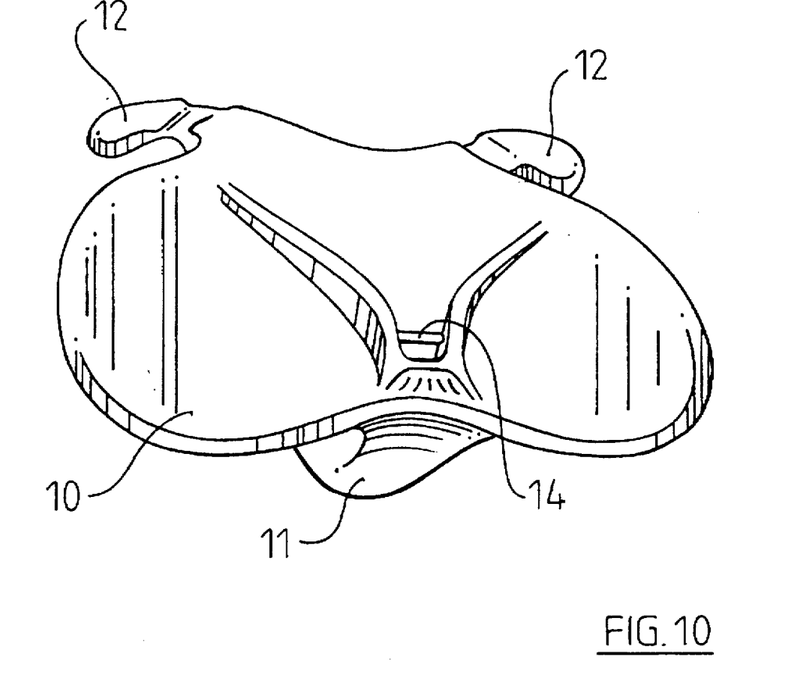
FIG. 10 is a front perspective view of an alternative to the part shown in FIG. 5.

The following table gives the results of experiments made with different anglers and shows the increase in line tension which could generate using the fishing rod support according to the invention, but excluding the embodiment in FIG. 10, compared with a typical example of the prior art rod supports. In each case the line tension is measured as the maximum comfortable pull.

TABLE

| ANGLER | HEIGHT mm | ANGLER WEIGHT Kg | LINE TENSION Kg | | % INCREASE |
| --- | --- | --- | --- | --- | --- |
| | | | PRIOR ART | INVENTION | |
| Male | 1900 | 115 | 15 | 26 | 70 |
| Male | 1750 | 96 | 14 | 23 | 60 |
| Male | 1763 | 80 | 12 | 18 | 50 |
| Female | 1750 | 67 | 14 | 19 | 36 |
| Male | 1625 | 56 | 11 | 16 | 46 |

ADVANTAGES

Thus the advantages of using fishing rod supports according to the invention are readily apparent, and average a 50% increase in line pull to the fish. Furthermore the design of the preferred embodiment as shown in FIG. 12 allows the gimbal device to be used with light tackle (ie rods without gimbal nocks as they can be positioned in and held in the recess).

I claim:

1. A fishing rod support comprising a substantially rigid apron dimensioned and adapted to traverse and bear upon the front of an angler's thighs, means for attaching the apron to a belt of the angler, a pivot point on the apron including means for receiving a butt end of a fishing rod, and located behind that surface of the apron which is to bear on the front of the angler's thighs, so that the pivot point will be positioned, in use, between and behind the front of the thighs, and a rearward projection of the apron adapted, in use, to project between the thighs of the angler.

2. A fishing rod support as claimed in claim 1, wherein the apron has a back adapted to abut the angler's thighs, and the projection comprises a rear face of a recess extending rearwardly from the front of the apron towards the angler.

3. A fishing rod support as claimed in claim 2, wherein the projection is shaped to conform to and fit against and between front and inner faces of the thighs of the angler, said projection extending rearwardly a distance greater than peripheral side regions of the apron.

4. A fishing rod support as claimed in claim 1, wherein the pivot point is located at the bottom of a recess extending rearwardly from the front of the apron.

5. A fishing rod support as claimed in claim 4, wherein the recess converges from the front of the apron towards the pivot point.

6. A fishing rod support as claimed in claim 5, wherein the recess converges downwardly towards the pivot point.

7. A fishing rod support as claimed in claim 1, wherein the pivot point comprises a pin mounted on the apron, on which pin a transverse groove or nock in the butt of the fishing rod can be fitted.

8. A fishing rod support comprising a substantially rigid apron dimensioned and adapted to traverse and bear upon the front of an angler's thighs, means for attaching the apron to the angler and a pivot point on the apron to receive a butt end of a fishing rod, said means for attaching the apron including a belt adapted to be worn by the angler and rapid attachment means of the apron to the belt, whereby the angler can wear the belt while fishing and quickly attach the apron thereto when a fish becomes hooked on a fishing line of the rod, said rapid attachment means including a pair of loops spaced apart on the front of the belt, and the periphery of the apron configured to form a pair of hook means said hook means including a pair of transverse arms extending in opposite directions, one adjacent each side of the apron and positioned so that each of the transverse arms can be hooked into one of said loops.

9. A fishing rod support as claimed in claim 8, wherein the arms point outwardly.

10. A fishing rod support as claimed in claim 8, wherein the arms point outwardly from upper outer corners of the apron.

* * * * *